(12) United States Patent
Tsuji et al.

(10) Patent No.: US 6,583,254 B2
(45) Date of Patent: Jun. 24, 2003

(54) PROPYLENE-BASED POLYMER AND FILM MADE OF THE SAME

(75) Inventors: Mitsuji Tsuji, Ichihara (JP); Kenichiro Yada, Sodegaura (JP); Syunji Yunoki, Sapporo (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/983,272

(22) Filed: Oct. 23, 2001

(65) Prior Publication Data

US 2002/0107351 A1 Aug. 8, 2002

(30) Foreign Application Priority Data

Oct. 25, 2000  (JP) .................................... 2000-325186

(51) Int. Cl.$^7$ ...................... C08F 110/06; C08F 210/06; C08F 210/08
(52) U.S. Cl. .................. 526/348.6; 526/348; 526/348.1; 526/351
(58) Field of Search .................. 526/348, 348.1, 526/348.6, 351

(56) References Cited

U.S. PATENT DOCUMENTS 4,668,753 A  5/1987  Kashiwa et al.
6,451,419 B1 * 9/2002  Tsurugai et al. ......... 428/304.4

FOREIGN PATENT DOCUMENTS

JP        59149909        8/1984

* cited by examiner

Primary Examiner—David W. Wu
Assistant Examiner—R. Rabago
(74) Attorney, Agent, or Firm—Birch, Stewart, Kolasch & Birch, LLP.

(57) ABSTRACT

A propylene-based polymer having a melt flow rate of 0.1 to 20 g/10 min. and a melting point Tm (° C.) measured by using a differential scanning calorimeter (DSC) of 147 to 159° C., in which the half width HW (° C.) of the melting peak measured by using a differential scanning calorimeter (DSC) and the melting point Tm (° C.) satisfy the relation: $HW \leq (188-Tm)/5$.

6 Claims, No Drawings

PROPYLENE-BASED POLYMER AND FILM MADE OF THE SAME

BACKGROUND OF THE INVENTION

1. Field of the Invention

The present invention relates to a propylene-based polymer and a stretched film prepared therefrom. More specifically, the present invention relates to a propylene-based polymer which provides a stretched film excellent in rigidity, heat resistance and stretchability when formed into a film, and a stretched film prepared therefrom.

2. Description of Related Art

Stretched polypropylene films are widely used as a wrapping material by utilizing their excellent transparency, gloss, rigidity, heat resistance, water vapor barrier property and the like. In stretched polypropylene films, a highly crystalline propylene homopolymer obtained by using a highly stereo-regular polymerization catalyst is used for improving the physical properties of the film such as rigidity and the like. However, a highly crystalline propylene homopolymer has a poor stretchability and has a defect that deterioration in film appearance, film cracking and the like tend to occur in stretching. Therefore, use of a propylene copolymer obtained by copolymerizing a small amount of ethylene or 1-butene is known, for improving the stretchability of a highly crystalline polypropylene homopolymer.

For example, JP59-135209A discloses a propylene copolymer in which the ethylene content is 0.1 to 2.0 mol % and the isotactic value satisfies a specific range, and a stretched polypropylene film excellent in stretchability, rigidity, transparency, impact resistance and heat shrinkage resistance obtained by using the above-mentioned copolymer.

Further, JP59-149909A discloses a propylene copolymer in which the 1-butene content is 0.1 to 2.5 mol% and the isotactic value satisfies a specific range, and a stretched polypropylene film excellent in stretchability, impact resistance, heat shrinkage resistance, transparency and rigidity obtained by using the above-mentioned copolymer.

However, these known stretched polypropylene films have insufficient stretchability due to small comonomer content, and even if the comonomer content is increased, the isotactic value of a propylene sequences decreases remarkably and balance of stretchability, rigidity and heat resistance is insufficient, only by increase in the comonomer content. Thus, further improvements have been required even in conventionally known methods, regarding a propylene-based polymer manifesting excellent rigidity, heat resistance and stretchability when used in a film, and a stretched film obtained by using this polymer.

SUMMARY OF THE INVENTION

The present inventors have intensively studied in view of the above-mentioned situations, and resultantly found that the present invention can solve the above-mentioned problems, leading to completion of the present invention.

An object of the present invention is to provide a propylene-based polymer which gives a stretched film excellent in rigidity, heat resistance and stretchability when used in a film, and a stretched film prepared from the same.

Namely, the present invention relates to a propylene-based polymer having a melt flow rate measured according to JIS K7210 of 1.0 to 20 g/10 min. and a melting point Tm (° C.) measured by using a differential scanning calorimeter (DSC) of 147 to 159° C., in which the half width HW (° C.) of the melting peak measured by using a differential scanning calorimeter (DSC) and the melting point Tm (° C.) satisfy the relation: $HW \leq (188-Tm)/5$, and a stretched film prepared from the propylene-based polymer.

The present invention will be illustrated specifically below.

DETAILED DESCRIPTION OF THE INVENTION

The propylene-based polymer of the present invention preferably has a melt flow rate (g/10 min.) of 1.0 to 20 g/10 min., more preferably 1.0 to 10 g/min. When the melt flow rate is less than 1.0 g/10 min., the flowability in extrusion processing may be insufficient, and when over 20 g/10 min., the stretching property may be insufficient.

The propylene-based polymer of the present invention has a melting point Tm (° C.) measured by using a differential scanning calorimeter (DSC) of 147 to 159° C. It is preferably 150 to 158° C., more preferably 152 to 157° C. When the melting point Tm (° C.) is less than 147° C., the rigidity of a stretched film may be insufficient, and when over 159° C., the stretching property of a film may deteriorate.

In the propylene-based polymer of the present invention, the half width HW (° C.) of the melting peak measured by using a differential scanning calorimeter (DSC) and the melting point Tm (° C.) satisfy the relation: $HW \leq (188-Tm)/5$, preferably the relation: $HW \leq (184-Tm)/5$, more preferably the relation: $HW \leq (182-Tm)/5$. When the half width HW (° C.) and the melting point Tm (° C.) manifest the relation: $HW > (188-Tm)/5$, a stretched film may not have excellent stretchability and excellent rigidity at the same time.

The propylene-based polymer of the present invention preferably includes a propylene homopolymer and a propylene-based random copolymer. A propylene-based random copolymer is preferable.

The propylene-based random copolymer of the present invention is a random copolymer obtained by copolymerizing propylene with at least one comonomer selected from ethylene and α-olefins having 4 to 20 carbon atoms.

Specific examples of the α-olefins having 4 to 20 carbon atoms include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene and the like. Preferably, 1-butene, 1-pentene, 1-hexene and 1-octene can be used, and further preferably, 1-butene and 1-hexene can be used.

As the propylene-based random copolymer of the present invention, for example, a propylene-ethylene random copolymer, propylene-1-butene random copolymer, propylene-1-hexene random copolymer, propylene-ethylene-1-butene random copolymer, propylene-ethylene-1-hexene random copolymer and the like are listed, preferably, a propylene-1-butene random copolymer is exemplified.

When the propylene-based random copolymer of the present invention is a propylene-ethylene random copolymer, the content of units derived from ethylene (herein-after, referred to as "ethylene content") is preferably 2.1 to 4.0 mol %, more preferably 2.2 to 3.0 mol %, from the standpoint of balance of rigidity, heat resistance and stretchability.

When the propylene-based random copolymer of the present invention is a propylene-α-olefin random copolymer, the content of units derived from the α-olefin (herein-after, referred to as "α-olefin content") is preferably 2.6 to 10 mol %, more preferably 3.0 to 8.0 mol %, from the standpoint of balance of rigidity, heat resistance and stretchability.

When the propylene-based random copolymer of the present invention is a propylene-ethylene-α-olefin copolymer, the total amount of the ethylene content and the α-olefin content is preferably 2.6 to 10 mol %, more preferably 3.0 to 8.0 mol %, from the standpoint of balance of rigidity, heat resistance and stretchability.

The producing method of the propylene-based polymer of the present invention is not particularly limited. However, the propylene-based polymer of the present invention can be preferably produced using a known polymerization catalyst system formed from (a) a solid catalyst component containing magnesium, titanium, halogen and an electron donor as essential components, (b) an organoaluminum compound, and (c) an electron donor component, for example, a catalyst system described in U.S. Pat. Nos. 4,983,561, 5,608,018, or 6,187,883, or the like, and adjusting appropriately polymerization conditions so that the propylene-based polymer of the present invention can be produced.

The method of producing a film of the present invention is not particularly restricted, and methods of producing a film usually conducted industrially are listed. For example, melt extrusion molding methods such as a T die film formation method, tubular film formation method and the like, and a method in which melt-extruded polypropylene is stretched along at least one direction, and the like are listed. Among them, a biaxial stretching method of stretching a resin along the longitudinal direction and the transverse direction is preferable since a film having an excellent mechanical property, transparency and the like together is obtained by this method.

The film of the present invention may be a multi-layer film, and in the case of a multi-layer film, the film of the present invention is used at least one layer component of a multi-layer film. As the method of producing a multi-layer film, a co-extrusion film formation method and the like are listed.

The polypropylene-based polymer and film of the present invention may also contain an antioxidant, neutralizing agent, stabilizer, lubricant, antistatic agent, antiblocking agent, and inorganic or organic various fillers, and the like, in an amount which does not deteriorate the object of the present invention.

The film forming method and stretching method are not particularly restricted, and there are usually listed a successive biaxial stretching method, simultaneous biaxial stretching method, tubular biaxial stretching method and the like described below.

Successive Biaxial Stretching

The propylene-based polymer is melted in an extruder, then, extruded through a T die, and solidified into a sheet by cooling with a cooling roll. Then, the resulted sheet is pre-heated and stretched along the longitudinal direction (flow direction of resin) by a series of heating rolls. Then, both ends of the resulted longitudinal stretched sheet are clamped by two lines of chucks arranged along the longitudinal direction, respectively, and the distance of the two lines of chucks is enlarged, in a heating furnace composed of a pre-heating part, stretching part and heat treatment part, to stretch the sheet along the transverse direction (width direction of resin). Then, The resulted film is optionally subjected to corona treatment or the like, and is wound.

Simultaneous Biaxial Stretching

The propylene-based resin is melted in an extruder, then, extruded through a T die, and solidified into a sheet by cooling with a cooling roll. Then, both ends of the resulted sheet are clamped by two lines of chucks arranged along the flow direction, respectively, and the distance between the two lines of chucks and the distance between respective neighboring chucks in each of the two lines are enlarged, in a heating furnace composed of a pre-heating part, stretching part and heat treatment part, to stretch the sheet along the longitudinal direction and the transverse direction simultaneously. The resulted film is optionally subjected to corona treatment or the like, and is wound.

Tubular Biaxial Stretching

The propylene-based resin is melted in an extruder, then, extruded through an annular die, and solidified into a tube by cooling in a water vessel. Then, the resulted tube is preheated by a heating furnace or a series of heating rolls, then, passed through a low speed nip roll, and wound on a high speed nip roll, to stretch the tube along the longitudinal direction. In this procedure, the tube is blown up by an internal pressure of air stored between the low speed nip roll and the high speed nip roll, to effect stretching along the transverse direction. Then, the stretched film passed through the high speed nip toll is heat-treated by a heating furnace or a series of heating rolls. The resulted film is optionally subjected to corona treatment or the like, and is wound.

The melting temperature of the propylene-based polymer of the present invention, in film formation of a stretched polypropylene film and in a stretching process, is appropriately controlled depending on the molecular weight, and usually from 230 to 290° C., preferably from 240 to 280° C.

When the stretching process is a sequential biaxial stretching, the longitudinal stretching temperature is usually from 100 to 160° C., preferably from 110 to 150° C., particularly preferably from 120 to 145° C. The longitudinal stretching magnification is usually from 3 to 8-fold, preferably from 3.5 to 7.5-fold, particularly preferably from 4 to 7-fold. The transverse stretching temperature is usually from 140 to 180° C., preferably from 150 to 175° C., particularly preferably from 155 to 170° C. The transverse stretching magnification is usually from 5 to 12-fold, preferably from 6 to 11-fold, particularly preferably from 7 to 10-fold.

When the stretching process is a simultaneous biaxial stretching, the stretching temperature is usually from 140 to 180° C., preferably from 150 to 175° C., particularly preferably from 155 to 170° C. The longitudinal stretching magnification and the transverse stretching magnification are usually from 3 to 9-fold, preferably from 3.5 to 8.5-fold, particularly preferably from 4 to 8-fold.

When the stretching process is a tubular biaxial stretching, the stretching temperature is usually from 120 to 180° C., preferably from 130 to 170° C., particularly preferably from 140 to 160° C. When the ratio of the thickness of an unstretched tube to the thickness of a stretched film is referred to as drawing magnification (unit:fold), the stretching magnification is usually from 10 to 60-fold, preferably from 20 to 50-fold, particularly preferably 30 to 40-fold.

The following examples will illustrate the present invention further in detail, but do not limit the scope of the invention.

Measurement of items in Examples and Comparative Examples were carried out according to the following methods.

(1) Preparing of Sample (1-1) Pelletization 0.15 wt % of tetrakis[methylene(3,5-di-tert-butyl-4-hydroxyhydrocinnamate)]methane and 0.10 wt % of tris (2,4-di-tert-butylphenyl)phosphite were added to a propylene-based polymer, and the polymer was granulated by an extruder to obtain pellet. The basic physical properties of this pellet are shown in Table 2.

(1-2) Film Forming

Then, the pellet was melt-extruded using a T die extruder equipped with a screw having a diameter of 65 mm at 270° C., then, cooled quickly by a cooling roll of 30° C. to obtain a sheet. This sheet was longitudinally stretched while heating at 145° C., then, transversely stretched while heating with hot air of 157° C., to accomplish sequential biaxial stretching, then, thermally treated under tension at 165° C. to obtain a biaxial stretched film having a thickness of 20 μ. The physical properties of this film are shown in Table 3.

(2) Measurement of Physical Properties of Propylene-Based Polymer Used in Examples and Comparative Examples (2-1) Melt Flow Rate (Unit: g/10 min.)

It was measured according to JIS K 7210.

(2-2) Comonomer Content (Unit: wt %)

① Ethylene unit content: It was determined by an IR spectral method according to a method described in Kobunshi Bunseki Handbook(1985, published by Asakura Shoten K. K.), p. 256, "(i) random copolymer".

② 1-butene unit content: It was determined according to the following formula using an IR spectral method.

1-butene content (wt %)=1.208 K'

K'=absorption at 767 $cm^{-1}$

The comonomer content represented in terms of wt % resulted by the measurement was converted into a unit of mol %.

(2-3) Melting Point (Tm)(Unit: ° C.)

For measuring the melting point (Tm), a polymer was thermally treated at 220° C. for 5 minutes, cooled to 150° C. at a temperature lowering rate of 300° C./min. and kept at 150° C. for 1 minute, further cooled down to 50° C. at a temperature lowering rate of 5° C./min. and kept at 50° C. for 1 minute, and further heated from 50° C. to 180° C. at a temperature rising rate of 5° C./min., and the melting peak temperature in this procedure was measured using a differential scanning calorimeter (DSC-7, manufactured by Perkin Elmer Co., Ltd.), as a melting point Tm.

(2-4) Melting Peak Half Width (HW)(Unit: ° C.)

The half width HW (° C.) of the melting peak was determined as a peak width at the midpoint of the height from the base line to the peak top of the melting peak in a DSC melting curve obtained by measurement of the melting point Tm (° C.).

(3) Measurement of Film Properties (3-1) Young's Modulus

Specimens having a width of 20 mm were collected along the longitudinal direction (machine direction: MD) and the transverse direction (TD) from a film which had been left for 1 week, after film formation, in a constant temperature and constant humidity room of a room temperature of 23° C. and a humidity of 50%, and an S—S curve was made at a chuck distance of 60 mm and a tensile speed of 5 mm/min. by a tensile tester, and the initial elastic modulus was measured. The measurement was conducted in the same constant temperature and constant humidity room.

(3-2) Stretchability

It was evaluated by the following two kinds of methods.

(a) Regarding the transverse stretching, both ends of a sheet longitudinally stretched are clamped with chucks, however, an unstretched part remains at the chuck part after completion of the stretching process. The width of the unstretched part was measured by a ruler. Larger the width, poorer the stretching property.

(b) The appearance of a stretched film when the film was stretched at a pre-heating temperature 9° C. lower than the temperature of standard condition, in the transverse stretching, was evaluated according to the following evaluation criteria.

○: Stretching unevenness was scarcely observed.

Δ: Stretching unevenness was observed.

×: Stretching unevenness was significant.

××: Film cracking occurred in a transverse stretching.

(3-3) Heat Shrinkage (Unit: %)

Specimens of A4 size were collected from a film which had been left for 1 week, after film formation, in a constant temperature and constant humidity room of a room temperature of 23° C. and a humidity of 50%, so that the major axis was parallel to MD, and label lines parallel to MD and TD, respectively, were written at an interval of 200 mm on the specimens, and left in an oven of 120° C. for 5 minutes, then, the heat shrinkage of the distance between the label lines was measured. The heat shrinkage was indication of heat resistance, and generally, smaller the heat shrinkage, more excellent the heat resistance.

EXAMPLE 1

(a) Synthesis of Reduced Solid Product

A 500 ml flask equipped with a stirrer and dropping funnel was purged with nitrogen, then, into this was charged 290 ml of hexane, 8.9 ml (8.9 g, 26.1 mmol) of tetrabutoxytitanium, 3.1 ml (3.3 g, 11.8 mmol) of diisobutyl phthalate and 87.4 ml (81.6 g, 392 mmol) of tetraethoxysilane, to give a uniform solution. Then, 199 ml of a solution of n-butylmagnesium chloride in di-n-butyl ether (manufactured by Yuki Gosei Yakuhin K. K., n-butylmagnesium chloride concentration: 2.1 mmol/ml) was added dropwise gradually over 5 hours from a dropping funnel while keeping temperature in the flask at 6° C. After completion of addition, the solution was further stirred for 1 hour at 6° C., then, stirred for additional 1 hour at room temperature. Then, the solution was subjected to solid-liquid separation, and thus obtained solid product was washed with 260 ml of toluene three times, then, to this was added toluene, to give a slurry concentration of 0.176 g/ml. A part of the solid product slurry was sampled, and the composition was analyzed. The solid product contained 1.96 wt % of a titanium atom, 0.12 wt % of a phthalate, 37.2 wt % of an ethoxy group and 2.8 wt % of a butoxy group.

(b) Synthesis of Solid Catalyst Component

A 100 ml flask equipped with a stirred, dropping funnel and thermometer was purged with nitrogen, then, into this was charged 52 ml of the solid product-containing slurry obtained in the above-mentioned (a), and 25.5 ml of the supernatant was taken out and, a mixture of 0.80 ml (6.45 mmol) of butyl ether and 16.0 ml (0.146 mol) of titanium tetrachloride was added, then, 1.6 ml (11.1 mmol, 0.20 ml per g of solid product) of phthaloyl chloride was added, the mixture was heated up to 115° C. and stirred for 3 hours at this temperature. After completion of the reaction, the resulted mixture was subjected to solid-liquid separation at the same temperature, then, the resulted solid was washed with 40 ml of toluene twice at the same temperature. Then, a mixture of 10.0 ml of toluene, 0.45 ml (1.68 mmol) of diisobutyl phthalate, 0.80 ml (6.45 mmol) of butyl ether and 8.0 ml (0.073 mmol) of titanium tetrachloride was added, and the resulted mixture was treated at 115° C. for 1 hour. After completion of the reaction, the reaction mixture was subjected to solid-liquid separation at the same temperature, and the resulted solid was washed with 40 ml of toluene three times at the same temperature, then, washed three times with 40 ml of hexane, and further dried under reduced pressure to obtain 7.36 g of a solid catalyst component. The solid catalyst component contained 2.18 wt % of a titanium atom, 11.37 wt % of a phthalate, 0.3 wt % of an ethoxy group and 0.1 wt % of a butoxy group. The solid catalyst component was observed by a stereoscopic microscope to find good particulate form without fine powder. This solid catalyst component is hereinafter referred to as "solid catalyst component A".

(c) Preliminary Polymerization

In an autoclave equipped with a stirrer, into hexane which had been sufficiently dehydrated and deaerated was added 25 mmol/L of triethylaluminum (TEA), tert-butyl-n-propyldimethoxysilane (hereinafter, abbreviated as tBnPDMS) as an electron donative catalyst component (tBnPDMS/TEA: 0.1 (molar ratio)), and the solid catalyst component A so that the final polymer amount per solid catalyst component (hereinafter, abbreviate as PP/cat) was 2.5 (g/g), and propylene was continuously fed into this while keeping the temperature at from 6 to 11° C., to obtain a preliminary polymer slurry. The resulted preliminary polymer slurry was transferred to an autoclave equipped with a stirrer, then, sufficiently purified liquid butane was added to this, and the mixture was stored while keeping the temperature lower than 10° C.

(d) Main Polymerization

Continuous gas phase polymerization was conducted using the preliminary polymer slurry produced in (c) as a solid catalyst component while feeding TEA and tBnPDMS, under conditions of maintaining propylene, butene and hydrogen in a gas phase part at constant concentrations, at a reactor inner temperature of 80° C. and a reactor inner pressure of 18 Kg/cm²G. The catalyst components were fed so that [TEA]=330 ppm and [tBnPDMS]=80 ppm in terms of concentration in the resulted polymer, and PP/cat=27000 (g/g). The average residence time was 3.4 hours. The polymerization conditions are shown in Tables 1-1 and 1-2. Thus obtained polymer was pelletized. A biaxial stretched film was obtained from the pellet. The physical properties of the resulted pellet and biaxial stretched film are shown in Tables 2 and 3.

EXAMPLE 2

A propylene-1-butene copolymer, pellets and biaxial stretched film were obtained in the same manners as in Example 1 except that the gas composition of a gas phase part, pressure, catalyst component feeding amounts and average residence time were changed as shown in Tables 1-1 and 1-2 in the main polymerization. The physical properties of the resulted pellet and biaxial stretched film are shown in Tables 2 and 3.

EXAMPLE 3

A propylene-1-butene copolymer, pellets and biaxial stretched film were obtained in the same manners as in Example 1 except that the gas composition of a gas phase part and the catalyst component feeding amounts were changed as shown in Tables 1-1 and 1-2 in the main polymerization. The physical properties of the resulted pellet and biaxial stretched film are shown in Tables 2 and 3.

COMPARATIVE EXAMPLE 1

A biaxial stretched film was obtained in the same manner as in Example 1 using an ethylene-propylene random copolymer pellet (manufactured by Sumitomo Chemical Co., Ltd., Sumitomo Norbrene FS2011D). The physical properties of the resulted pellet and the biaxial stretched film are shown in Tables 2 and 3.

COMPARATIVE EXAMPLE 2

A biaxial stretched film was obtained in the same manner as in Example 1 using a propylene homopolymer pellet (manufactured by The Polyolefin Company (Singapore), COSMOPLENE FS3011P). The physical properties of the resulted pellet and biaxial stretched film are shown in Tables 2 and 3.

TABLE 1-1

|  | Temperature (° C.) | Pressure (K/G) | Gas composition | | |
| --- | --- | --- | --- | --- | --- |
|  |  |  | [H2] (vol %) | [C'3] (vol %) | [C'4] (vol %) |
| Example 1 | 80 | 18 | 0.27 | 89 | 3.4 |
| Example 2 | 80 | 17 | 1.10 | 87 | 4.5 |
| Example 3 | 80 | 17 | 1.10 | 88 | 3.4 |

TABLE 1-2

| | Catalyst component content in PP | | Average residence time (hr) | PP/cat (g/g) |
| --- | --- | --- | --- | --- |
| | [TEA] (wt. ppm) | Electron donor catalyst component (wt. ppm) | | |
| Example 1 | 330 | 80 | 3.4 | 27000 |
| Example 2 | 290 | 70 | 3.0 | 31000 |
| Example 3 | 330 | 80 | 3.4 | 28000 |

TABLE 2

| | Melt flow rate (g/10 min.) | Comonomer content | | Melting point (Tm) (° C.) | Half width (HW) (° C.) | (HW)'* |
| --- | --- | --- | --- | --- | --- | --- |
| | | Ethylene (mol %) | 1-butene (mol %) | | | |
| Example 1 | 1.9 | 0 | 2.7 | 156.2 | 4.65 | 6.36 |
| Example 2 | 1.6 | 0 | 3.8 | 154.3 | 4.88 | 6.74 |
| Example 3 | 1.8 | 0 | 3.0 | 155.9 | 4.88 | 6.42 |
| Comparative example 1 | 2.7 | 0.6 | 0 | 157.4 | 6.57 | 6.12 |
| Comparative example 2 | 2.3 | 0 | 0 | 158.1 | 11.3 | 5.98 |

Note *:(HW)' = (188−Tm)/5

TABLE 3

| | Young's modulus (kg/cm$^2$) | | Heat shrinkage (%) | | Width of unstretched part (mm) | Stretchability Low temperature stretchability |
|---|---|---|---|---|---|---|
| | MD | TD | MD | TD | | |
| Example 1 | 22400 | 37600 | 3.1 | 0.9 | 64 | ○ |
| Example 2 | 22000 | 34600 | 3.1 | 0.8 | 50 | ○ |
| Example 3 | 22900 | 36900 | 3.3 | 0.6 | 59 | ○ |
| Comparative Example 1 | 22100 | 39400 | 3.7 | 0.8 | 75 | Δ~× |
| Comparative Example 2 | 21000 | 39000 | 4.3 | 1.4 | 81 | ○ |

It is found that in Examples 1 to 3 satisfying the requirements in the present invention, the rigidity (Young's modulus), heat resistance (heat shrinkage) and stretchability are excellent.

However, it is found that, in Comparative Example 1 which does not satisfy the relation HW≦(188−Tm)/5, the heat resistance and stretchability are insufficient, and in Comparative Example 2 which does not satisfy the above-mentioned condition, the rigidity, heat resistance and stretchability are insufficient.

As described in detail above, the present invention can provide a propylene-based polymer which gives a stretched film excellent in rigidity, heat resistance and stretchability when used as a film, and a stretched film obtained by using the same.

What is claimed is:

1. A propylene-based polymer having a melt flow rate measured according to JIS K 7210 of 1.0 to 20 g/10 min. and a melting point Tm (° C.) measured by using a differential scanning calorimeter of 147 to 159° C., in which the half width HW (° C.) of the melting peak measured by using a differential scanning calorimeter (DSC) and the melting point Tm (° C.) satisfy the relation: HW≦(188−Tm)/5.

2. The propylene-based polymer according to claim 1, wherein the propylene-based polymer is a propylene-based random copolymer.

3. The propylene-based polymer according to claim 1, wherein the propylene-based polymer is a propylene-1-butene random copolymer.

4. A stretched film obtained by using a propylene-based polymer according to claim 1.

5. A stretched film obtained by using a propylene-based polymer according to claim 2.

6. A stretched film obtained by using a propylene-based polymer according to claim 3.

* * * * *